US012423853B2

(12) United States Patent
Cai et al.

(10) Patent No.: US 12,423,853 B2
(45) Date of Patent: Sep. 23, 2025

(54) METHOD AND APPARATUS FOR CORRECTING PERSPECTIVE OF ROAD IMAGE

(71) Applicant: Beijing Baidu Netcom Science Technology Co., Ltd., Beijing (CN)

(72) Inventors: Junjie Cai, Beijing (CN); Kai Zhong, Beijing (CN); Jianzhong Yang, Beijing (CN); Deguo Xia, Beijing (CN); Tongbin Zhang, Beijing (CN); Zhen Lu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 342 days.

(21) Appl. No.: 17/976,367

(22) Filed: Oct. 28, 2022

(65) Prior Publication Data

US 2023/0052842 A1    Feb. 16, 2023

(30) Foreign Application Priority Data

Dec. 21, 2021   (CN) .......................... 202111568762.8

(51) Int. Cl.
*G06T 7/70* (2017.01)
*G06V 10/44* (2022.01)
*G06V 20/56* (2022.01)

(52) U.S. Cl.
CPC .............. *G06T 7/70* (2017.01); *G06V 10/44* (2022.01); *G06V 20/588* (2022.01); *G06T 2207/30256* (2013.01)

(58) Field of Classification Search
CPC ... G06T 7/70; G06T 5/80; G06T 2207/30256; G06T 7/11; G06T 7/12; G06V 10/24;
(Continued)

(56) References Cited

U.S. PATENT DOCUMENTS

2012/0283895 A1    11/2012  Noda
2015/0278611 A1*   10/2015  Chi ...................... G06V 20/586
                                                           348/148
2021/0248392 A1*   8/2021   Zaheer ................. G06V 10/764

FOREIGN PATENT DOCUMENTS

CN      103035005 B    8/2015
CN      106682563 A    5/2017
(Continued)

OTHER PUBLICATIONS

Zhang et al., "Lane line recognition based on improved 2D-gamma function and variable threshold Canny algorithm under complex environment," Measurement and Control, 2020.
(Continued)

*Primary Examiner* — Sumati Lefkowitz
*Assistant Examiner* — Anna Lei
(74) *Attorney, Agent, or Firm* — Seed Intellectual Property Law Group LLP

(57) ABSTRACT

A method and apparatus for processing an image. The method may include: acquiring a top view of a road; identifying a position of a lane line from the top view; cutting the top view into at least two areas, and determining, according to the position of the lane line in each area, a width of a lane in the each area and an average width of the lane in the top view; calculating a first perspective correction matrix by optimizing a first loss function, the first loss function being used to represent a difference between the width of the lane in the each area and the average width of the lane in the top view; and performing a lateral correction on the top view through the first perspective correction matrix to obtain a first corrected image.

20 Claims, 5 Drawing Sheets

(58) Field of Classification Search
CPC ...... G06V 10/44; G06V 20/588; G06V 10/74; G06V 10/26
See application file for complete search history.

(56) References Cited

FOREIGN PATENT DOCUMENTS

| | | | | | |
|---|---|---|---|---|---|
| CN | 107424196 | A | | 12/2017 | |
| CN | 108805823 | A | | 11/2018 | |
| CN | 109255316 | A | | 1/2019 | |
| CN | 111428538 | A | * | 7/2020 | ......... G06K 9/00798 |
| CN | 111652937 | A | | 9/2020 | |
| CN | 110163039 | B | * | 11/2020 | |
| CN | 111996883 | B | * | 10/2021 | ............. E01C 23/01 |
| KR | 2006084745 | A | * | 7/2006 | ............. G06T 5/006 |
| KR | 10-1637535 | B1 | | 7/2016 | |
| KR | 20180022277 | A | | 3/2018 | |
| WO | 2020087322 | A1 | | 5/2020 | |

OTHER PUBLICATIONS

Zheng et al., "Lane recognition technique of prediction and inverse projection based on Kalman," Computer Engineering and Design, 2009.
Guosheng et al., "Laneline semantic segmentation algorithm based on convolutional neural network," Journal of Electronic Measurement and Instrumentation, vol. 32, No. 7, 2018.
Chinese Notice of Allowance for Chinese Application No. 114267027, dated Mar. 13, 2025, 5 pages.

* cited by examiner

METHOD AND APPARATUS FOR CORRECTING PERSPECTIVE OF ROAD IMAGE

This patent application claims the priority of Chinese Patent Application No. 202111568762.8, filed on Dec. 21, 2021, and entitled "Method and Apparatus for Processing Image", the entire content of which is herein incorporated by reference.

TECHNICAL FIELD

The present disclosure relates to the field of artificial intelligence, particularly to the field of intelligent transportation, and specifically to a method and apparatus for processing an image.

BACKGROUND

In photography and cinematography, perspective distortion refers to a warping or transformation of an object and its surrounding area that differ completely from what is seen from a standard lens, due to the relative scale of nearby and distant features.

Map data is a basic and important part of a navigation system, and a top view is key information to the production of the map data. A high-definition top view is generally generated by projecting a panoramic photo. Under the influence of a factor such as a lens distortion, a road surface gradient and an equipment movement, the top view tends to have a large deformation, that is, perspective distortion.

SUMMARY

The present disclosure provides a method and apparatus for processing an image, a device, and a storage medium.

According to a first aspect of the present disclosure, a method for processing an image is provided. The method includes: acquiring a top view of a road; identifying a position of a lane line from the top view; cutting the top view into at least two areas, and determining, according to the position of the lane line in each area, a width of a lane in the each area and an average width of the lane in the top view; calculating a first perspective correction matrix by optimizing a first loss function, the first loss function being used to represent a difference between the width of the lane in the each area and the average width of the lane in the top view; and performing a lateral correction on the top view through the first perspective correction matrix to obtain a first corrected image.

According to a second aspect of the present disclosure, an apparatus for processing an image is provided. The apparatus includes: an acquiring unit, configured to acquire a top view of a road; an identifying unit, configured to identify a position of a lane line from the top view; a determining unit, configured to cut the top view into at least two areas, and determine, according to the position of the lane line in each area, a width of a lane in the each area and an average width of the lane in the top view; a calculating unit, configured to calculate a first perspective correction matrix by optimizing a first loss function, the first loss function being used to represent a difference between the width of the lane in the each area and the average width of the lane in the top view; and a correcting unit, configured to perform a lateral correction on the top view through the first perspective correction matrix to obtain a first corrected image.

According to a third aspect of the present disclosure, an electronic device is provided. The electronic device includes: at least one processor; and a memory, communicatively connected to the at least one processor. The memory stores an instruction executable by the at least one processor, and the instruction is executed by the at least one processor, to enable the at least one processor to perform the method according to the first aspect.

According to a fourth aspect of the present disclosure, a non-transitory computer readable storage medium storing a computer instruction is provided. The computer instruction is used to cause a computer to perform the method according to the first aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

Figure 1:
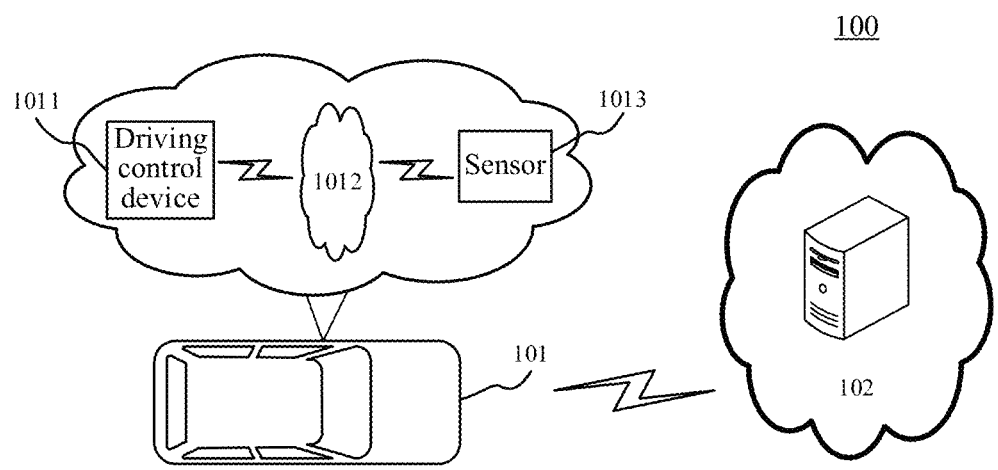
FIG. 1 is a diagram of an exemplary system architecture in which an embodiment of the present disclosure may be applied.

FIG. 1 illustrates an exemplary system architecture 100 in which an embodiment of a method for processing an image or an apparatus for processing an image according to the present disclosure may be applied.

As shown in FIG. 1, the system architecture 100 may include an autonomous driving vehicle 101 (unmanned vehicle for short).

In the autonomous driving vehicle 101, a driving control device 1011, a network 1012, a sensor 1013 and a server 102 are installed. The network 1012 serves as a medium providing a communication link between the driving control device 1011 and the sensor 1013. The network 1012 may include various types of connections, for example, wired or wireless communication links, or optical fiber cables.

The driving control device (also referred to as a vehicle-mounted brain) 1011 is responsible for the intelligent control of the autonomous driving vehicle 101. The driving control device 1011 may be a separately provided controller, for example, a programmable logic controller (PLC), a single-chip microcomputer, and an industrial control computer; may be a device composed of other electronic devices having an input/output port and having an arithmetic control function; or may be a computer device installed with a vehicle driving control application.

It should be noted that, in practice, the autonomous driving vehicle 101 may be installed with at least one sensor, for example, a lidar, a camera, a gravity sensor, and a wheel speed sensor. In some situations, the autonomous driving vehicle 101 may alternatively be installed with a GNSS (global navigation satellite system) device, an SINS (strap-down inertial navigation system), and the like.

The camera of the unmanned vehicle collects road images and then sends the images to the server for analysis processing. The server performs a perspective correction on an identification result of a road. Accordingly, the imaging ratio of a ground object in a top view is the same as that in the real world, and the perspective distortion due to near the larger and the far the smaller is eliminated. Moreover, all parallel lines in reality are displayed parallel in the image. The image after the perspective correction is fed back to the unmanned vehicle. The image after the perspective correction is close to the projection imaging ratio in the real world, and the unmanned vehicle precisely calculates the position of a ground element according to the image after the perspective correction.

The perspective correction (or referred to as perspective control) is a process of composing or editing photographs to obtain a result consistent with the understanding of the public for the perspective distortions. This correction process includes the following.

All vertical lines in reality are made to appear in the vertical direction in the image. These vertical lines include upright posts, vertical sides of walls, lamp posts, and the like. It should be noted that this is a commonly accepted understanding of people for the perspective result. The basis for such perspective result is that the farther the object is, the smaller the object in the image is. Due to the distance in the vertical direction, the top of a building is farther from a viewer than the base of the building. However, generally, from a constructed perspective, only the distance in the horizontal direction is taken into consideration, regardless of the distance in the vertical direction. That is, it is considered that the distance of the top of the building and the viewer is the same as that of the base of the building.

For example, in a square room, all parallel lines such as four horizontal sides intersect at a point.

It should be noted that the method for processing an image provided in the embodiments of the present disclosure is generally performed by the server 102, and correspondingly, the apparatus for processing an image is generally provided in the server 102.

It should be appreciated that the numbers of the driving control devices, the networks, the sensors, and the servers in FIG. 1 are merely illustrative. Any number of driving control devices, networks, sensors and servers may be provided based on actual requirements.

Figure 2:
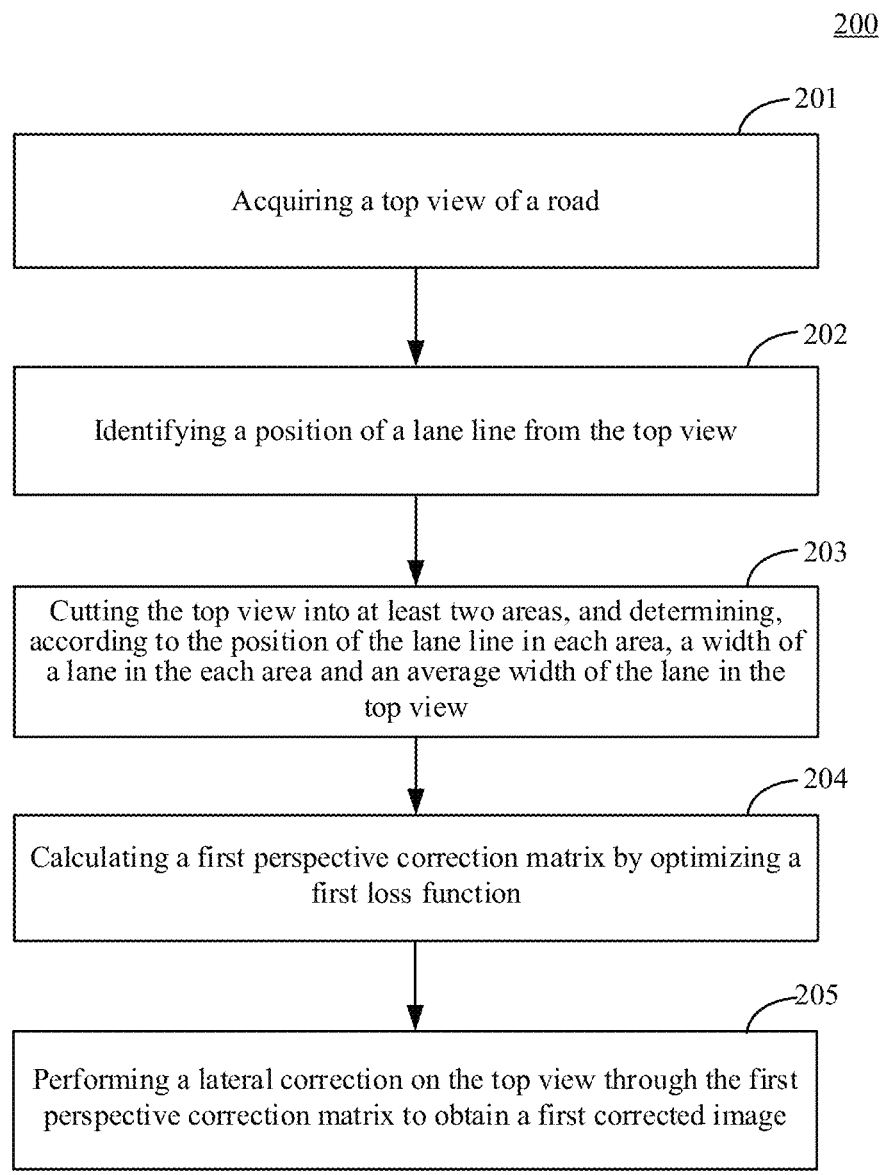
FIG. 2 is a flowchart of an embodiment of a method for processing an image according to the present disclosure.

Further referring to FIG. 2, FIG. 2 illustrates a flow 200 of a method for processing an image according to an embodiment of the present disclosure. The method for processing an image includes the following steps.

Step 201, acquiring a top view of a road.

In this embodiment, an executing body (e.g., the server shown in FIG. 1) of the method for processing an image may acquire the top view of the road from a camera. A high-definition top view is generally generated by projecting a panoramic photo. Under the influence of a factor such as a lens distortion, a road surface gradient and an equipment movement, the top view tends to have a large deformation, that is, perspective distortion.

Step 202, identifying a position of a lane line from the top view.

In this embodiment, a semantic segmentation may be performed on the top view using a deep learning model (including, but not limited to, an fcn, a unet, a segnet, a deeplab series, a pspnet, and the like), to segment the lane line. It is also possible to segment the lane line using an image processing means. Not only the position of the lane line, but also the type of the lane line can be identified, for example, a single-line type, a double-line type, a solid-line type, and a dashed-line type. Herein, the two lines merged may be served as a single line for processing, and the center line between the two lines is served as a lane line.

Step 203, cutting the top view into at least two areas, and determining, according to the position of the lane line in each area, a width of a lane in the each area and an average width of the lane in the top view.

In this embodiment, the top view may be cut into the at least two areas by segmenting a lane line. The top view may be equally cut, or fine-grained cutting may be performed on an area where the distortion is severe (e.g., a distant lane line area). Alternatively, the cutting may be performed at the interval of the dashed lane line, to ensure that the each area has a complete dashed lane line.

A near neighbor search is performed on the lane line identified in step 202, and pairing is performed on each two lane lines, and thus, a set of several matching pairs $P=\{<I_i, I_j>, <I_m, I_j> \ldots <<I_m, I_n>\}$ can be obtained, where each matching pair $<I_i, I_j>$ refers to one lane, and $I_i$ and $I_j$ are respectively the left and right lane lines of the lane.

The widths $w^P=\{w_1, w_2, \ldots w_k\}$ of each lane $<I_i, I_j>$ in different areas of the image are calculated.

If three lane lines $I_1$, $I_2$ and $I_3$ from top to bottom are identified from the top view, the lane lines can be combined into three lanes $\{<I_1, I_2>, <I_1, I_3>, <I_2, I_3>\}$. The theoretical values of the widths of the lanes $<I_1, I_2>$ and $<I_2, I_3>$ should be the same, and are half of the theoretical value of the width of lane $<I_1, I_3>$.

Due to the perspective distortion, the width of the lane is not a constant value in the view. The lane width corresponding to the middle position of the each area may be used as the lane width of the area. The average width of the lane in the area may alternatively be used as the width of the lane in the area.

The average value of the widths of the lanes in the each area is used as the average width of the lane in the top view.

Step 204, calculating a first perspective correction matrix by optimizing a first loss function.

In this embodiment, here, the first loss function is used to represent a difference between the width of the lane in the each area and the average width of the lane in the top view.

The widths of the same lane in different areas of the image are different under the influence of the perspective distortion. In order to eliminate the perspective distortion, it is required to make the widths of the same lane in different areas of the image as equal as possible, and then there is a loss function:

$$L(M_1) = \sqrt{\frac{\sum_{i=1}^{k}(w_i - \emptyset)^2}{k}}.$$

Here, $M_1$ is a 3*3 perspective correction matrix, $w_i$ refers to the widths of each lane in k different areas of the image, and $\emptyset$ is the average width of the lane in different areas of the image.

An optimal perspective correction matrix $M_1$ is solved by optimizing the loss function. A target function is to make $L(M_1)$ minimal.

If there are a plurality of lanes, there are a plurality of loss functions, for example, $L_1(M_1), L_2(M_1), \ldots L_n(M_1)$. The sum of the plurality of loss functions is used as a total loss function. The target of the optimization is to make the total loss function minimal.

The first perspective correction matrix may be solved mathematically, or the first perspective correction matrix may be solved by gradient descent.

Step 205, performing a lateral correction on the top view through the first perspective correction matrix to obtain a first corrected image.

In this embodiment, the perspective correction result of an image t is as follows:

$$t'=M1*t.$$

Here, $M_1$ is the first perspective correction matrix, t is the top view, and t' is the first corrected image.

The method provided in the above embodiment of the present disclosure relies solely on the perspective correction on the lane line, thereby being independent of an inertial sensor and independent of a camera calibration. A vehicle-mounted camera does not affect the effect even if the vehicle-mounted camera is displaced or rotated due to a road bump. The problem of the precision of a low-cost camera and the problem of high calibration costs are solved. Compared with the existing scheme, the method has a higher precision. An operator performs a map data production operation with reference to the top view after the perspective correction, thereby being more intuitive and accurate. The operational efficiency and the quality of data results are improved.

In some alternative implementations of this embodiment, the identifying a position of a lane line from the top view includes: identifying a pixel and type of the lane line from the top view through a semantic segmentation model, to generate a semantic segmentation image; and extracting the position of the lane line from the semantic segmentation image. The semantic segmentation model outputs a mask image of an image segmentation result. The value of each pixel on the mask image is a category number, 0 represents a background, 1 represents a white solid line, 2 represents a white dashed line, 3 represents a yellow solid line, and the like. Since the segmentation result often generates some noise spots, the influence of the noise spots can be eliminated by performing expansion and corrosion processing on the image, and then the outer contour of each lane line can be obtained by using a contour tracking algorithm. The position of the lane line is determined based on the center line of the outer contour. In this way, the position of the lane line can be quickly and accurately extracted, thereby reducing the time of processing the image and ensuring the safety when the unmanned vehicle travels.

In some alternative implementations of this embodiment, the extracting the position of the lane line from the semantic segmentation image includes: transforming the semantic segmentation image into a binary image; performing a contour detection on the binary image to obtain a rectangular contour; splitting the rectangular contour into a plurality of segments along a direction of a long side of the rectangular contour, and performing the contour detection on each segment again to generate a plurality of sub-contours; extracting a center line of each sub-contour rectangle as a linear vector of the lane line; and fitting the linear vector of the lane line through a quadratic curve, and predicting and supplementing a missing part of the lane line.

Extracting and vectorizing a lane line from a semantic segmentation image mainly includes the following four steps.

1. Binarization: The type and pixel of the lane line are extracted from the semantic segmentation image, and the lane line is transformed into a binary image.

2. Contour Detection: A contour detection is performed on the binary image of the lane line, for example, the findContours method of the cv2 library.

Figure 3:
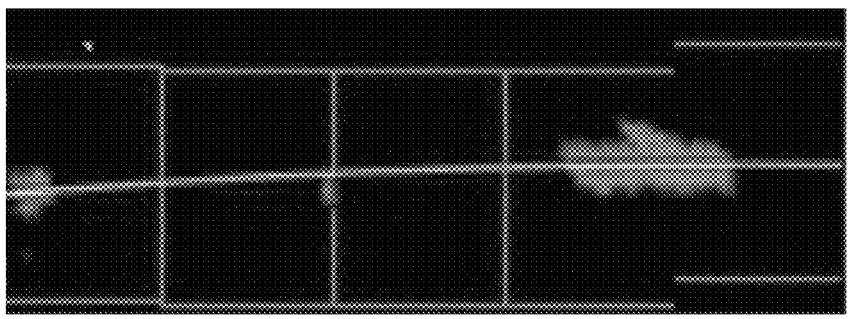
FIG. 3 is a schematic diagram of a result of an extraction and vectorization for lane line of the method for processing an image according to the present disclosure.

3. Contour Splitting: As shown in FIG. 3, the rectangular contour is broken into m segments along its long side. The contour detection is performed again to generate m sub-contours. The center line of a sub-contour rectangle is extracted as a linear vector of the lane line.

4. The linear vector of the lane line that is generated in the previous step is fitted through a quadratic curve, and the missing part of the lane line is predicted and supplemented.

$$f(y)=Ay^3+By+C$$

When the image definition is insufficient and the lane line is incomplete, the complete lane line can still be fitted through the above steps, and thus, the lane width and the length of the dashed lane line can be accurately calculated. Therefore, the precision of the map is improved, and the driving safety is ensured.

In some alternative implementations of this embodiment, the determining, according to a position of a lane line in each area, a width of a lane in the each area and an average width of the lane in the top view includes: performing a near neighbor search on the identified lane line, and pairing each two lane lines to obtain a matching pair set, each matching pair corresponding to one lane; calculating, for each lane, a lane width of a middle position of the each area as a width of the lane in the each area; and calculating the average width of the lane in the top view based on the width of the lane in the each area.

The near neighbor search is performed on the lane line identified in step 202, and the pairing is performed on the each two lane lines, and thus, the set of several matching pairs $P=\{<I_i, I_j>, <I_m, I_j><I_m, I_n>\}$ can be obtained, where each matching pair $<I_i, I_j>$ refers to one lane, and $I_i$ and $I_j$ are respectively the left and right lane lines of the lane.

The widths $w^P=\{w_1, w_2, \ldots, w_k\}$ of each lane $<I_i, I_j>$ in different areas of the image are calculated.

If three lane lines $I_1$, $I_2$ and $I_3$ from top to bottom are identified from the top view, the lane lines can be combined into three lanes $\{<I_1, I_2>, <I_1, I_3>, <I_2, I_3>\}$. The theoretical values of the widths of the lanes $<I_1, I_2>$ and $<I_2, I_3>$ should be the same, and are half of the theoretical value of the width of lane $<I_1, I_3>$.

Due to the perspective distortion, the width of the lane is not a constant value in the view. The lane width corresponding to the middle position of the each area may be used as the lane width of the area. The average width of the lane in the area may alternatively be used as the width of the lane in the area.

With the lane width of the middle position of the each area as the width of the lane in the area, the amount of calculation can be reduced, the image processing speed can be accelerated, thereby reducing the time delay and ensuring the driving safety.

In some alternative implementations of this embodiment, the acquiring a top view of a road includes: acquiring a panoramic view of the road; and transforming the panoramic view into the top view through a perspective projection method. The image collected by the unmanned vehicle is typically a panoramic view, and the panoramic view can be transformed into a top view through the perspective projection method. The transforming can be performed using conventional existing software, for example, OpenCV. Thus, it is possible to make the image close to the projection imaging ratio in the real world by correcting the deformation of the top view, and calculate precisely the position of the ground element based on the top view, thereby implementing the positioning for the target object in the panoramic view.

Figure 4:
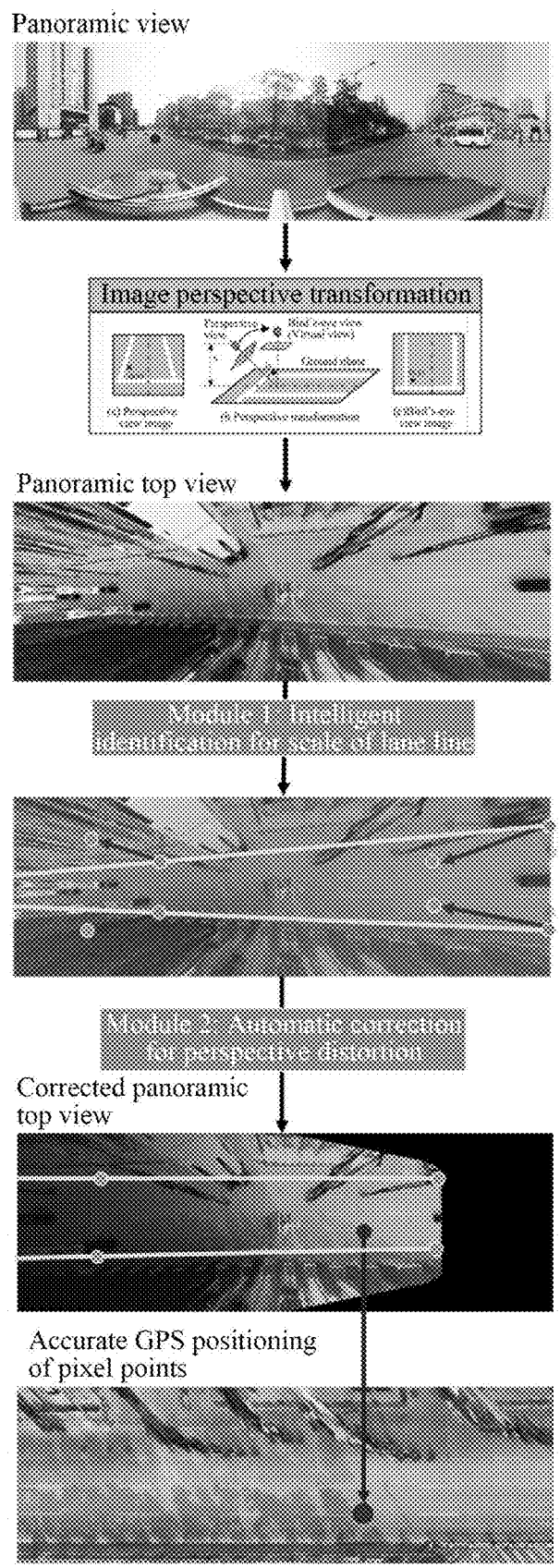
FIG. 4 is a schematic diagram of an application scenario of the method for processing an image according to the present disclosure.

Further referring to FIG. 4, FIG. 4 is a schematic diagram of an application scenario of the method for processing an image according to this embodiment. In the application scenario of FIG. 4, an unmanned vehicle collects a panoramic view during traveling. The panoramic view is transformed into a panoramic top view through an image perspective transformation algorithm. A lane line is identified from the panoramic top view through a semantic segmentation model, and a width of a lane is determined. The deformation in the top view is calibrated in such a way that the widths of the lane are equal to each other in the top view, to obtain a corrected panoramic top view. Then, for the pixel points in the panoramic top view, GPS positioning can be precisely performed.

Figure 5:
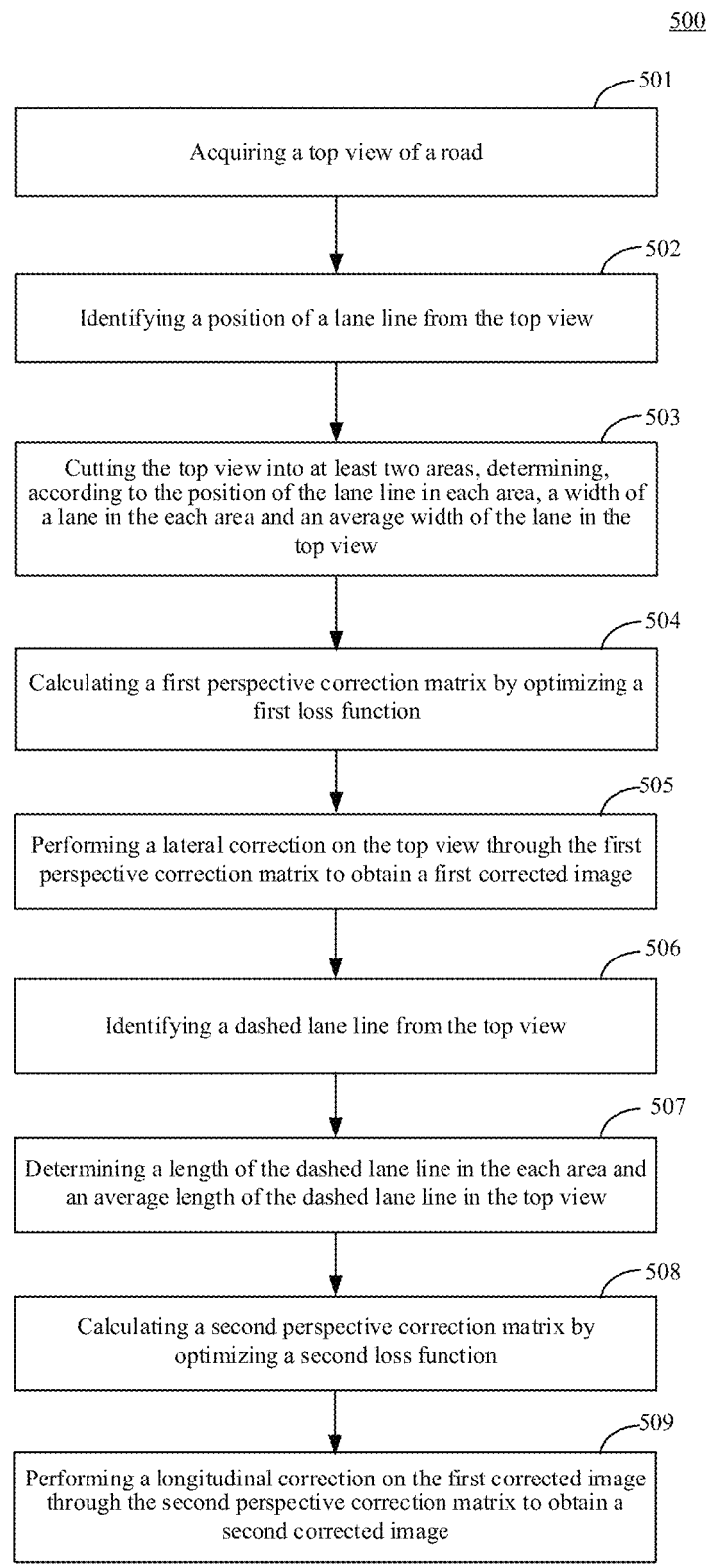
FIG. 5 is a flowchart of another embodiment of the method for processing an image according to the present disclosure.

Further referring further to FIG. 5, FIG. 5 illustrates a flow 500 of another embodiment of the method for processing an image. The flow 500 of the method for processing an image includes the following steps.

Step 501, acquiring a top view of a road.

Step 502, identifying a position of a lane line from the top view.

Step 503, cutting the top view into at least two areas, determining, according to the position of the lane line in each area, a width of a lane in the each area and an average width of the lane in the top view.

Step 504, calculating a first perspective correction matrix by optimizing a first loss function.

Step 505, performing a lateral correction on the top view through the first perspective correction matrix to obtain a first corrected image.

Steps 501-505 are substantially the same as steps 201-205, and thus will not be repeatedly described.

Step 506, identifying a dashed lane line from the top view.

In this embodiment, the dashed line of the lane line can be identified from the top view through a semantic segmentation model. That is, there is a type of a pixel in a segmentation result, and thus, the dashed line can be identified.

Alternatively, if no dashed lane line is identified from the current top view, it is possible to continue to acquire a plurality of panoramic views collected by an unmanned vehicle to transform the panoramic views to a plurality of top views from which the dashed lane line is identified. The panoramic images collected by the same camera at the same gradient have the same perspective distortion, and thus, the perspective correction matrix calculated from one panoramic image can be shared by these panoramic views.

Step 507, determining a length of the dashed lane line in the each area and an average length of the dashed lane line in the top view.

In this embodiment, if there is no perspective distortion, the length of the dashed lane line is theoretically uniform. At least one dashed lane line is included in a cut area. The length of one dashed lane line other than the dashed lane line at the beginning and the dashed lane line at the end in the each area may be arbitrarily selected as the length of the dashed lane line in the area. The average value of the lengths of the dashed lane lines in all areas is used as the average length of the dashed lane line in the top view. The length of the dashed lane line may be expressed as $l^P=\{l_1, l_2, \ldots, l_k\}$.

Alternatively, when the area is cut, the cutting is performed according to the length of the dashed lane line, such that each area has only one dashed lane line.

Step 508, calculating a second perspective correction matrix by optimizing a second loss function.

In this embodiment, here, the second loss function is used to represent a difference between the length of the dashed lane line in the each area and an average length of the dashed lane line in the top view.

Similarly, under the influence of the perspective distortion, the lengths of the same dashed lane line in different areas of the image are different. In order to eliminate the perspective distortion, it is required to make the lengths of the same lane in different areas of the image as equal as possible, and thus, there is a loss function:

$$L(M_2) = \sqrt{\frac{\sum_{i=1}^{k}(l_i - \lambda)^2}{k}}$$

Here, $M_2$ is a 3*3 perspective correction matrix, $l_i$ is the lengths of each lane in k different areas of the top view, and $\lambda$ is the average length of the lane in different areas of the top view.

The second perspective correction matrix may be solved mathematical method or may be solved through a gradient descent approach.

Step 509, performing a longitudinal correction on the first corrected image through the second perspective correction matrix to obtain a second corrected image.

In this embodiment, the optimal second perspective correction matrix $M_2$ is solved by optimizing the loss function, and the final second corrected image t" of the image t is:

$$t''=M2*t'.$$

It can be seen from FIG. 5 that, as compared with the embodiment corresponding to FIG. 2, the flow 500 of the method for processing an image in this embodiment reflects the step of performing the longitudinal correction on the top view. Accordingly, according to the scheme described in this embodiment, the image can be further corrected, thus implementing the comprehensive perspective correction.

In some alternative implementations of this embodiment, the determining a length of the dashed lane line in the each area and an average length of the dashed lane line in the top view includes: using, for the each area, a length of a complete dashed lane line in middle of the area as the length of the dashed lane line in the area; and calculating the average length of the dashed lane line based on the length of the dashed lane line in the each area. In this way, the calculation speed can be accelerated, thereby reducing the time delay and ensuring the driving safety.

Figure 6:
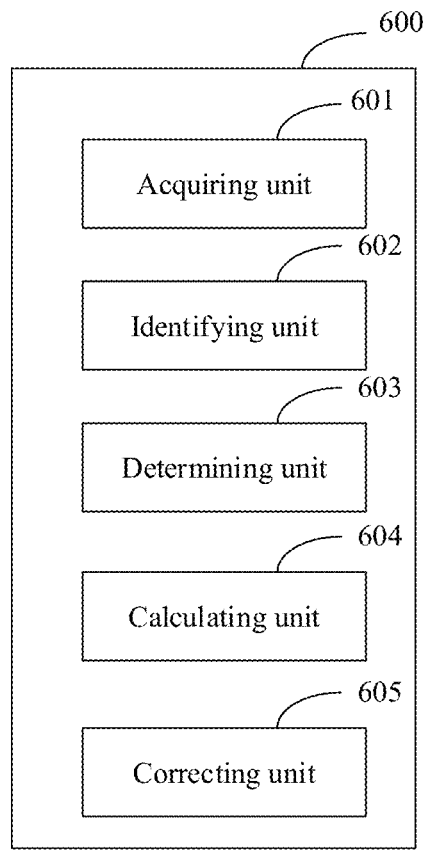
FIG. 6 is a schematic structural diagram of an embodiment of an apparatus for processing an image according to the present disclosure.

Further referring to FIG. 6, as an implementation of the method shown in the above drawings, the present disclosure provides an embodiment of an apparatus for processing an image. The embodiment of the apparatus corresponds to the embodiment of the method shown in FIG. 2. The apparatus may be applied in various electronic devices.

As shown in FIG. 6, the apparatus 600 for processing an image in this embodiment includes: an acquiring unit 601, an identifying unit 602, a determining unit 603, a calculating unit 604 and a correcting unit 605. Here, the acquiring unit 601 is configured to acquire a top view of a road. The identifying unit 602, configured to identify a position of a lane line from the top view. The determining unit 603 is configured to cut the top view into at least two areas, and determine, according to the position of the lane line in each area, a width of a lane in the each area and an average width of the lane in the top view. The calculating unit 604 is configured to calculate a first perspective correction matrix by optimizing a first loss function, the first loss function being used to represent a difference between the width of the lane in the each area and the average width of the lane in the top view. The correcting unit 605 is configured to perform a lateral correction on the top view through the first perspective correction matrix to obtain a first corrected image.

In this embodiment, for specific processes of the acquiring unit 601, the identifying unit 602, the determining unit 603, the calculating unit 604 and the correcting unit 605 in the apparatus 600 for processing an image, reference may be made to step 201, step 202, step 203, step 204 and step 205 in the corresponding embodiment of FIG. 2.

In some alternative implementations of this embodiment, the identifying unit 602 is further configured to identify a dashed lane line from the top view. The determining unit 603 is further configured to determine a length of the dashed lane line in the each area and an average length of the dashed lane line in the top view. The calculating unit 604 is further configured to calculate a second perspective correction matrix by optimizing a second loss function, the second loss function being used to represent a difference between the length of the dashed lane line in the each area and the average length of the dashed lane line in the top view. The correcting unit 605 is further configured to perform a longitudinal correction on the first corrected image through the second perspective correction matrix to obtain a second corrected image.

In some alternative implementations of this embodiment, the identifying unit 602 is further configured to: identify a pixel and type of the lane line from the top view through a semantic segmentation model, to generate a semantic segmentation image; and extract the position of the lane line from the semantic segmentation image.

In some alternative implementations of this embodiment, the identifying unit 602 is further configured to: transform the semantic segmentation image into a binary image; perform a contour detection on the binary image to obtain a rectangular contour; split the rectangular contour into a plurality of segments along a direction of a long side of the rectangular contour, and perform the contour detection on each segment again to generate a plurality of sub-contours; extract a center line of each sub-contour rectangle as a linear vector of the lane line; and fit the linear vector of the lane line through a quadratic curve, and predict and supplement a missing part of the lane line.

In some alternative implementations of this embodiment, the calculating unit 604 is further configured to: perform a near neighbor search on the identified lane line, and pair each two lane lines to obtain a matching pair set, where each matching pair corresponds to one lane; calculate, for each lane, a lane width of a middle position of the each area as a width of the lane in the each area; and calculate the average width of the lane in the top view based on the width of the lane in the each area.

In some alternative implementations of this embodiment, the determining unit 603 is further configured to: use, for the each area, a length of a complete dashed lane line in middle of the area as the length of the dashed lane line in the area; and calculate the average length of the dashed lane line based on the length of the dashed lane line in the each area.

In some alternative implementations of this embodiment, the acquiring unit 601 is further configured to: acquire a panoramic view of the road; and transform the panoramic view into the top view through a perspective projection apparatus.

In the technical solution of the present disclosure, the collection, storage, use, processing, transmission, provision, disclosure, etc. of the personal information of a user all comply with the provisions of the relevant laws and regulations, and do not violate public order and good customs.

According to an embodiment of the present disclosure, the present disclosure further provides an electronic device, a readable storage medium and a computer program product.

According to the method and apparatus for processing an image provided by the embodiments of the present disclosure, the deformation of the top view is calibrated by controlling the widths of the same lane to be equal in the top view based on the lane line identification result, thereby greatly improving the precision of positioning an element in the top view.

An electronic device includes at least one processor, and a memory communicatively connected to the at least one processor. Here, the memory stores an instruction executable by the at least one processor, and the instruction is executed by the at least one processor, to enable the at least one processor to perform the method described by the flow 200 or 500.

A non-transitory computer readable storage medium stores a computer instruction. Here, the computer instruction is used to cause a computer to perform the method described by the flow 200 or 500.

A computer program product includes a computer program. The computer program, when executed by a processor, implements the method described by the flow 200 or 500.

Figure 7:
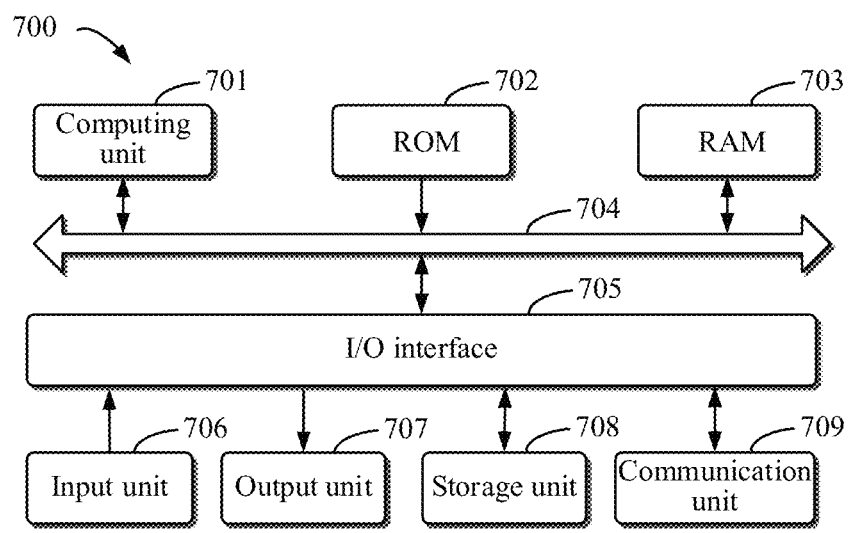
FIG. 7 is a schematic structural diagram of a computer system of an electronic device adapted to implement the embodiments of the present disclosure.

FIG. 7 is a schematic block diagram of an example electronic device 700 that may be used to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital assistant, a cellular telephone, a smart phone, a wearable device and other similar computing apparatuses. The parts shown herein, their connections and relationships, and their functions are only as examples, and not intended to limit the implementations of the present disclosure as described and/or claimed herein.

As shown in FIG. 7, the electronic device 700 includes a computing unit 701, which may execute various appropriate actions and processes in accordance with a computer program stored in a read-only memory (ROM) 702 or a computer program loaded into a random access memory (RAM) 703 from a storage unit 708. The RAM 703 also stores various programs and data required by operations of the device 700. The computing unit 701, the ROM 702 and the RAM 703 are connected to each other through a bus 704. An input/output (I/O) interface 705 is also connected to the bus 704.

The following components in the electronic device 700 are connected to the I/O interface 705: an input unit 706, for example, a keyboard and a mouse; an output unit 707, for example, various types of displays and a speaker; a storage unit 708, for example, a magnetic disk and an optical disk; and a communication unit 709, for example, a network card, a modem, a wireless communication transceiver. The communication unit 709 allows the device 700 to exchange information/data with an other device through a computer network such as the Internet and/or various telecommunication networks.

The computing unit 701 may be various general-purpose and/or special-purpose processing assemblies having processing and computing capabilities. Some examples of the computing unit 701 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computing unit 701 performs the various methods and processes described above, for example, the method for processing an image. For example, in some embodiments, the method for processing an image may be implemented as a computer software program, which is tangibly included in a machine readable medium, for example, the storage unit 708. In some embodiments, part or all of the computer program may be loaded into and/or installed on the device 700 via the ROM 702 and/or the communication unit 709. When the computer program is loaded into the RAM 703 and executed by the computing unit 701, one or more steps of the above method for processing an image may be performed. Alternatively, in other embodiments, the computing unit 701 may be configured to perform the method for processing an image through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, a distributed system server, or a server combined with a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for processing an image, comprising:
    acquiring a top view of a road;
    identifying a position of a lane line from the top view;
    cutting the top view into at least two areas, and determining, according to the position of the lane line in each area, a width of a lane in the each area and an average width of the lane in the top view;
    calculating a first perspective correction matrix by optimizing a first loss function, the first loss function being used to represent a difference between the width of the lane in the each area and the average width of the lane in the top view; and
    performing a lateral correction on the top view through the first perspective correction matrix to obtain a first corrected image.

2. The method according to claim 1, further comprising:
    identifying a dashed lane line from the top view;
    determining a length of the dashed lane line in the each area and an average length of the dashed lane line in the top view;
    calculating a second perspective correction matrix by optimizing a second loss function, the second loss function being used to represent a difference between the length of the dashed lane line in the each area and the average length of the dashed lane line in the top view; and
    performing a longitudinal correction on the first corrected image through the second perspective correction matrix to obtain a second corrected image.

3. The method according to claim 1, wherein the identifying the position of the lane line from the top view comprises:
    identifying a pixel and type of the lane line from the top view through a semantic segmentation model, to generate a semantic segmentation image; and
    extracting the position of the lane line from the semantic segmentation image.

4. The method according to claim 3, wherein the extracting the position of the lane line from the semantic segmentation image comprises:
    transforming the semantic segmentation image into a binary image;
    performing a contour detection on the binary image to obtain a rectangular contour;
    splitting the rectangular contour into a plurality of segments along a direction of a long side of the rectangular contour, and performing the contour detection on each segment again to generate a plurality of sub-contours;
    extracting a center line of each sub-contour rectangle as a linear vector of the lane line; and
    fitting the linear vector of the lane line through a quadratic curve, and predicting and supplementing a missing part of the lane line.

5. The method according to claim 1, wherein the determining, according to the position of the lane line in the each area, the width of the lane in the each area and the average width of the lane in the top view comprises:
    performing a near neighbor search on the identified lane line, and pairing each two lane lines to obtain a matching pair set, wherein each matching pair corresponds to one lane;
    calculating, for each lane, a lane width of a middle position of the each area as a width of the lane in the each area; and
    calculating the average width of the lane in the top view based on the width of the lane in the each area.

6. The method according to claim 2, wherein the determining the length of the dashed lane line in the each area and the average length of the dashed lane line in the top view comprises:
    using, for the each area, a length of a complete dashed lane line in middle of the area as the length of the dashed lane line in the area; and
    calculating the average length of the dashed lane line based on the length of the dashed lane line in the each area.

7. The method according to claim 1, wherein the acquiring the top view of the road comprises:
    acquiring a panoramic view of the road; and
    transforming the panoramic view into the top view through a perspective projection method.

8. An electronic device, comprising:
    at least one processor; and
    a memory, communicatively connected to the at least one processor,
    wherein the memory stores an instruction executable by the at least one processor, and the instruction is executed by the at least one processor, to enable the at least one processor to perform operations, the operations comprising:
    acquiring a top view of a road;
    identifying a position of a lane line from the top view;
    cutting the top view into at least two areas, and determining, according to the position of the lane line in each area, a width of a lane in the each area and an average width of the lane in the top view;
    calculating a first perspective correction matrix by optimizing a first loss function, the first loss function being used to represent a difference between the width of the lane in the each area and the average width of the lane in the top view; and
    performing a lateral correction on the top view through the first perspective correction matrix to obtain a first corrected image.

9. The electronic device according to claim 8, further comprising:
    identifying a dashed lane line from the top view;
    determining a length of the dashed lane line in the each area and an average length of the dashed lane line in the top view;
    calculating a second perspective correction matrix by optimizing a second loss function, the second loss function being used to represent a difference between the length of the dashed lane line in the each area and the average length of the dashed lane line in the top view; and performing a longitudinal correction on the first corrected image through the second perspective correction matrix to obtain a second corrected image.

10. The electronic device according to claim 8, wherein the identifying the position of the lane line from the top view comprises:
   identifying a pixel and type of the lane line from the top view through a semantic segmentation model, to generate a semantic segmentation image; and
   extracting the position of the lane line from the semantic segmentation image.

11. The electronic device according to claim 10, wherein the extracting the position of the lane line from the semantic segmentation image comprises:
   transforming the semantic segmentation image into a binary image;
   performing a contour detection on the binary image to obtain a rectangular contour;
   splitting the rectangular contour into a plurality of segments along a direction of a long side of the rectangular contour, and performing the contour detection on each segment again to generate a plurality of sub-contours;
   extracting a center line of each sub-contour rectangle as a linear vector of the lane line; and
   fitting the linear vector of the lane line through a quadratic curve, and predicting and supplementing a missing part of the lane line.

12. The electronic device according to claim 8, wherein the determining, according to the position of the lane line in the each area, the width of the lane in the each area and the average width of the lane in the top view comprises:
   performing a near neighbor search on the identified lane line, and pairing each two lane lines to obtain a matching pair set, wherein each matching pair corresponds to one lane;
   calculating, for each lane, a lane width of a middle position of the each area as a width of the lane in the each area; and
   calculating the average width of the lane in the top view based on the width of the lane in the each area.

13. The electronic device according to claim 9, wherein the determining the length of the dashed lane line in the each area and the average length of the dashed lane line in the top view comprises:
   using, for the each area, a length of a complete dashed lane line in middle of the area as the length of the dashed lane line in the area; and
   calculating the average length of the dashed lane line based on the length of the dashed lane line in the each area.

14. The electronic device according to claim 8, wherein the acquiring the top view of the road comprises:
   acquiring a panoramic view of the road; and
   transforming the panoramic view into the top view through a perspective projection electronic device.

15. A non-transitory computer readable storage medium, storing a computer instruction, wherein the computer instruction, when executed by a processor, causes the processor to perform operations, the operations comprising:
   acquiring a top view of a road;
   identifying a position of a lane line from the top view;
   cutting the top view into at least two areas, and determining, according to the position of the lane line in each area, a width of a lane in the each area and an average width of the lane in the top view;
   calculating a first perspective correction matrix by optimizing a first loss function, the first loss function being used to represent a difference between the width of the lane in the each area and the average width of the lane in the top view; and
   performing a lateral correction on the top view through the first perspective correction matrix to obtain a first corrected image.

16. The non-transitory computer readable storage medium according to claim 15, further comprising:
   identifying a dashed lane line from the top view;
   determining a length of the dashed lane line in the each area and an average length of the dashed lane line in the top view;
   calculating a second perspective correction matrix by optimizing a second loss function, the second loss function being used to represent a difference between the length of the dashed lane line in the each area and the average length of the dashed lane line in the top view; and
   performing a longitudinal correction on the first corrected image through the second perspective correction matrix to obtain a second corrected image.

17. The non-transitory computer readable storage medium according to claim 15, wherein the identifying the position of the lane line from the top view comprises:
   identifying a pixel and type of the lane line from the top view through a semantic segmentation model, to generate a semantic segmentation image; and
   extracting the position of the lane line from the semantic segmentation image.

18. The non-transitory computer readable storage medium according to claim 17, wherein the extracting the position of the lane line from the semantic segmentation image comprises:
   transforming the semantic segmentation image into a binary image;
   performing a contour detection on the binary image to obtain a rectangular contour;
   splitting the rectangular contour into a plurality of segments along a direction of a long side of the rectangular contour, and performing the contour detection on each segment again to generate a plurality of sub-contours;
   extracting a center line of each sub-contour rectangle as a linear vector of the lane line; and
   fitting the linear vector of the lane line through a quadratic curve, and predicting and supplementing a missing part of the lane line.

19. The non-transitory computer readable storage medium according to claim 15, wherein the determining, according to the position of the lane line in the each area, the width of the lane in the each area and the average width of the lane in the top view comprises:
   performing a near neighbor search on the identified lane line, and pairing each two lane lines to obtain a matching pair set, wherein each matching pair corresponds to one lane;
   calculating, for each lane, a lane width of a middle position of the each area as a width of the lane in the each area; and
   calculating the average width of the lane in the top view based on the width of the lane in the each area.

20. The non-transitory computer readable storage medium according to claim 16, wherein the determining the length of the dashed lane line in the each area and the average length of the dashed lane line in the top view comprises:
   using, for the each area, a length of a complete dashed lane line in middle of the area as the length of the dashed lane line in the area; and calculating the average length of the dashed lane line based on the length of the dashed lane line in the each area.

* * * * *